United States Patent [19]

Gingerich

[11] Patent Number: 5,738,176
[45] Date of Patent: Apr. 14, 1998

[54] AUTOMATIC HITCHING SYSTEM

[76] Inventor: Newton Roy Gingerich, 565 Snyders Rd East, Baden, Canada, N0B 1G0

[21] Appl. No.: 525,765

[22] PCT Filed: Mar. 18, 1994

[86] PCT No.: PCT/CA94/00147

§ 371 Date: Sep. 20, 1995

§ 102(e) Date: Sep. 20, 1995

[87] PCT Pub. No.: WO94/21106

PCT Pub. Date: Sep. 29, 1994

[30] Foreign Application Priority Data

Mar. 22, 1993 [GB] United Kingdom ............... 9305934

[51] Int. Cl.$^6$ .................................................. A01B 59/06
[52] U.S. Cl. ........................ 172/274; 172/272; 280/186
[58] Field of Search ............................... 172/272, 273, 172/274; 37/468; 280/481, 186

[56] References Cited

U.S. PATENT DOCUMENTS

| | | |
|---|---|---|
| 2,602,389 | 7/1952 | Markel . |
| 3,512,665 | 5/1970 | Westendorf .................. 172/273 X |
| 3,659,362 | 5/1972 | Bell ............................ 280/481 X |
| 3,760,883 | 9/1973 | Birk ............................ 172/273 |
| 3,887,096 | 6/1975 | Wieland ...................... 172/272 X |
| 4,214,840 | 7/1980 | Beales ........................ 172/272 X |
| 4,986,722 | 1/1991 | Kaczmarczyk et al. ...... 172/272 X |
| 5,179,794 | 1/1993 | Ballinger .................... 172/272 X |
| 5,333,400 | 8/1994 | Sonerud ...................... 37/468 |

*Primary Examiner*—Terry Lee Melius
*Assistant Examiner*—Christopher J. Novosad
*Attorney, Agent, or Firm*—Anthony Asquith & Co.

[57] ABSTRACT

A battery-powered grass mower (12) is hitched to en electric garden tractor (10). The hitching system has arms (27) pivoted (29) to the tractor, which can be raised and lowered by means of ah electric actuator strut (45). To hitch, the tractor is maneuvered until pegs (30) pivoted on the arms are poised above sockets (20) on the mower; then, using the electric actuator, the arms are lowered, driving the pegs into the sockets. Once firmly engaged, a latch (36) engages and retains the pegs into the sockets. The latch is releasable electrically. All aspects of hitching and unhitching are under remote control from the driver's seat.

12 Claims, 3 Drawing Sheets

1

AUTOMATIC HITCHING SYSTEM

This invention relates to a hitching system, of the kind used to hitch an accessory to a tractor.

The invention is particularly applicable to the case where the accessory is, for example, a grass mower, and the tractor is a lawn-and-garden tractor. The invention is particularly applicable when the tractor is powered by battery electricity, or has electric power on board, and when the accessory is also powered from batteries on the tractor.

Hitherto, for hitching accessories such as a grass mower, or a dump bucket, or a snow-blower, or a snow-plough, or a post-hole borer, from a lawn-and-garden tractor, the usual procedure was for the driver to get down from the tractor and make the necessary hitching connections. This could be quite a demanding task, because the accessory had to be man-handled into the correct position relative to the tractor.

The invention is concerned with automatic hitching; that is to say, in the invention, the aim is that the driver drives the tractor into position relative to the accessory, and then operates controls, from the driver's seat, to pick up the accessory, lock it to the tractor, and make the accessory ready for operative use. It is an aim of the invention that the driver of the tractor need not get out of his seat in order to hitch the accessory. Equally, it is an aim that the driver can un-hitch or release the accessory from the tractor, after use, without leaving his seat.

The accessory will often be kept in a suitable storage location, such as a garden-house or utility shed. The operations of hitching and un-hitching will take place in this shed, although occasionally, of course, the accessory will need to be hitch or un-hitched at some other location. An automatic hitching system should enable the accessory to be picked up while the accessory is against a wall of the shed; and it is an aim of the invention to reduce the need to provide access space all around the accessory.

GENERAL FEATURES OF THE INVENTION

The hitching system of the invention provides a pivoting arm, which can be raised or lowered by means of a power-operated variable-length strut. Preferably the pivoting arm is pivoted to the tractor. Preferably, the strut is of the kind that is powered by an electric motor. Preferably, there are two arms, arranged parallel to each other, and pivoted to the tractor about a common pivot axis.

Mounted at the ends of the arms is a cross-beam, which is pivotable with respect to the arms. Pegs are rigidly attached to the cross-beam. The pegs are disposed so as to engage complementary sockets mounted on the accessory.

The driver engages the pegs into the sockets by first positioning the tractor so that the pegs lie over the sockets, and then lowering the arms so that the pegs enter the sockets. The driver lowers the arms by activating the variable length strut.

As the pegs enter into, and become fully engaged into, the sockets, a latch automatically snags the pegs to the sockets. Once the latch is engaged, the driver may now raise the arms (by means of the variable length strut) and by doing so raise also the accessory.

The accessory may be mounted to the tractor, by virtue of the type of hitching system, with a degree of resilient suspension movement of the accessory. The suspension spring or springs may be arranged in compression, to urge the accessory downwards, whereby the reaction to the spring force acts to lift the tractor itself upwards; alternatively, and preferably, the spring may be arranged in tension, to lift the accessory upwards, whereby the reaction to the spring force acts to place (some of) the weight of the accessory onto the tractor.

In previous hitching systems, it has been known for accessories to be mounted in front of, behind, or underneath, the tractor. In the invention, it is preferred that the hitching system be associated with the front of the tractor. Hitching an accessory underneath the tractor is a disadvantage in that access space is required virtually all around the accessory; on the other hand, the underneath-arrangement does promote a good weight distribution. Preferably, for convenience of operational control, the accessory should be hitched at the front of the tractor; if the driving wheels of the tractor are the from wheels (as they often are on an electric tractor).

In the invention, the pegs engage with the sockets, and when they are fully engaged the latch mechanism latches the pegs into the sockets. It is arranged that the direction in which the pegs engage/disengage the sockets is not a direction in which heavy or abusive loads might be applied during operation of the accessory. Therefore, the latch mechanism need not be made robust enough to cope with such abusive loads. In fact, as will be seen from the description below, suspension forces between the tractor and the accessory may be allowed to pass through the latch mechanism, because the magnitude of the suspension forces is limited by the resilience of the suspension spring, and because there is no rubbing or other disruptive relative movement at the latch during suspension movement.

Preferably, the pegs engage into the sockets in a vertical direction. The driver manoeuvres the tractor until the pegs are poised vertically above the mouths of the sockets; then he lowers the arms, with the pegs thereon, into the sockets. If the pegs and sockets are set vertically—that is to say, the direction of engagement of the peg into the socket is vertical, any resistance due to misalignment of the accessory with the tractor does not cause the accessory to be deflected away. Aligning the peg-to-socket engagement direction horizontally, by contrast, would have the effect that if engagement were to be at all forceful, the accessory would tend to move away.

On the other hand, although it is better for the direction of engagement of the pegs should be vertical in the case of wheeled accessories, a different direction, for example horizontal, may be more appropriate with other types of accessory.

DETAILED DESCRIPTION OF PREFERRED EMBODIMENT

By way of further explanation of the invention, exemplary embodiments of the invention will now be described with reference to the accompanying drawings, in which.

The apparatus shown in the accompanying drawings and described below is an example which embodies the invention. It should be noted that the scope of the invention is defined by the accompanying claims, and not necessarily by specific features of exemplary embodiments.

Figure 1:
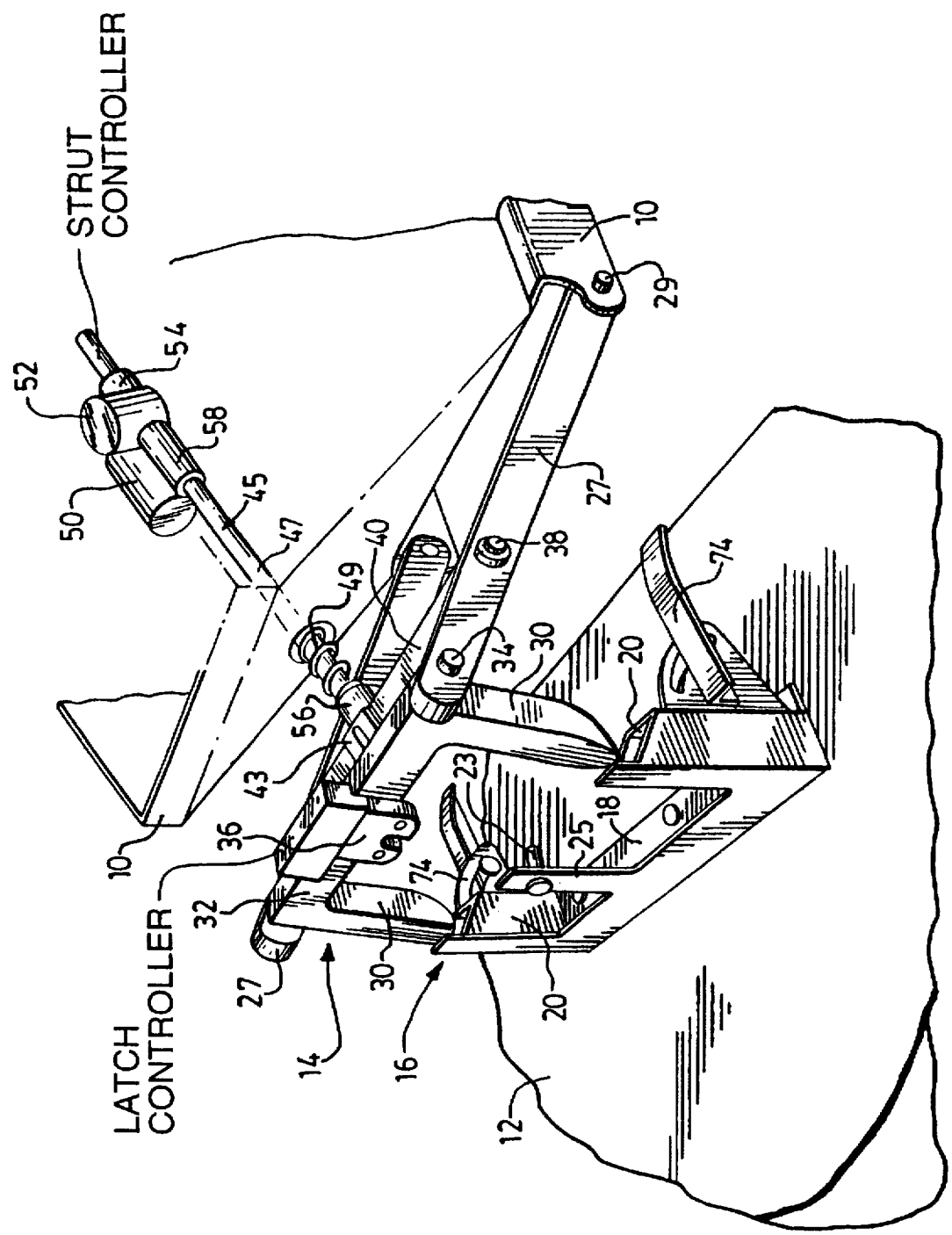
FIG. 1 is a pictorial view showing a grass mower being hitched to a lawn-and-garden tractor using a hitching system which embodies the present invention.

As shown in FIG. 1, a tractor 10 is on the point of picking up or hitching a grass mower 12. The hitching system comprises two main components: the tractor component 14, which is attached to the tractor; and the mower component 16, which is attached to the mower.

The mower component 16 includes a base plate 18, which is bolted to the frame or cover of the mower 12. The mower component includes a pair of sockets 20, which are of a hollow square tube configuration. These sockets stand (nearly) vertically. A latch pin 23 is included in the mower component, and is attached to a latch pin bracket 25.

The tractor component 14 includes a pair of arms 27, which are coupled to suitable pivot points 29 provided on the tractor. The axis of the pivot 29 is horizontal, and lateral with respect to the tractor, whereby the arms can swing through an arc in a vertical plane.

The tractor component includes a pair of pegs 30, which are solid with a cross-beam 32. The dimensions and spacing of the pegs 30 are such that the pegs will enter into, and slide into engagement with, the sockets 20. The cross-beam 32 is pivoted at 34 to the outer ends of the arms 27. A latch assembly 36 is mounted on the cross-beam 32, and is arranged to co-operate with the latch pin 23.

Also pivoted to the arms 27, at an intermediate point 38, is a cross-bar 40. Carried on the cross-bar 40 is a connection 43 to the lower end of an electric actuator 45. The electric actuator includes an actuator rod 47 mounted inside a spring 49. At its upper end, the actuator includes an electric motor 50 and a gearbox 52. The housing of the motor/gearbox is mounted in a trunnion 54 attached to the chassis of the tractor 10. The spring 49 is in tension. At its lower end, the spring 49 is wound into an internally-grooved collar 56 which is welded to the cross-bar 40. The upper end of the spring is similarly attached to a collar 58.

Figure 2:
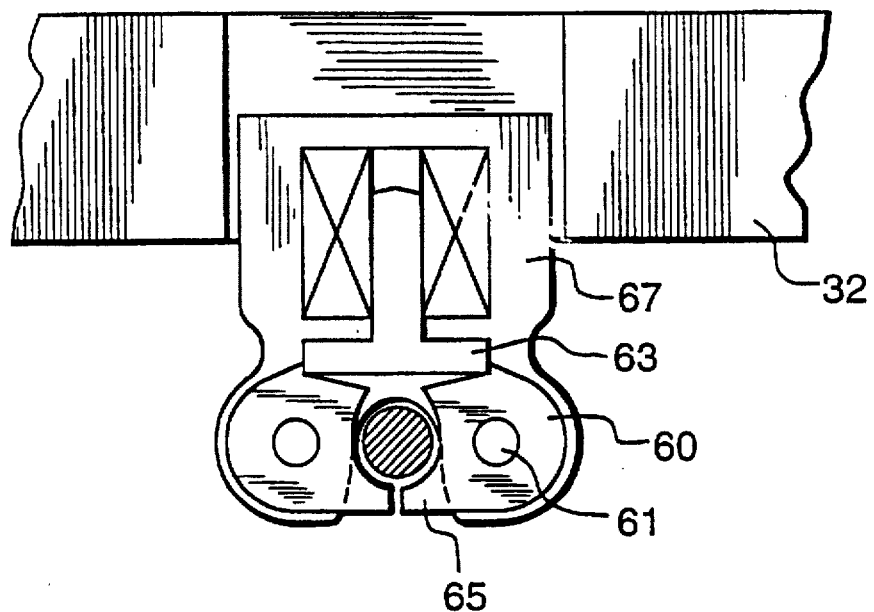
FIG. 2 is a diagram of a latch mechanism of the system of FIG. 1.

FIG. 2 is a diagrammatic view of the latch assembly 36. Latch levers 60 are carried on pivots 61. The levers are spring-loaded in the direction to urge the top ends of the levers together, but the levers are prevented from undergoing such movement by the presence of a blocker 63. The levers carry beaks 65, which, when the blocker 63 is in the position as shown, snag the latch pin 23 into the mechanism. The blocker 63 is movable by the action of a solenoid 67. When the solenoid is activated, the blocker moves clear, and the top ends of the levers 60 move together. The beaks 65 then move apart, releasing the latch pin 23. The solenoid-operated latch assembly is a standard proprietary item (of the kind used on trunk lids of automobiles, for example) and will not be described further. Even though the latch assembly is a conventional structure, the type of structure as described is especially advantageous for use with the invention, as it permits the latch levers to snag the latch pin automatically, and to lock, simply upon being pressed together, and yet permits the latch to be released by remote (solenoid) control. Many other designs of latch are not self-snagging and yet remotely releasable.

Figure 3:
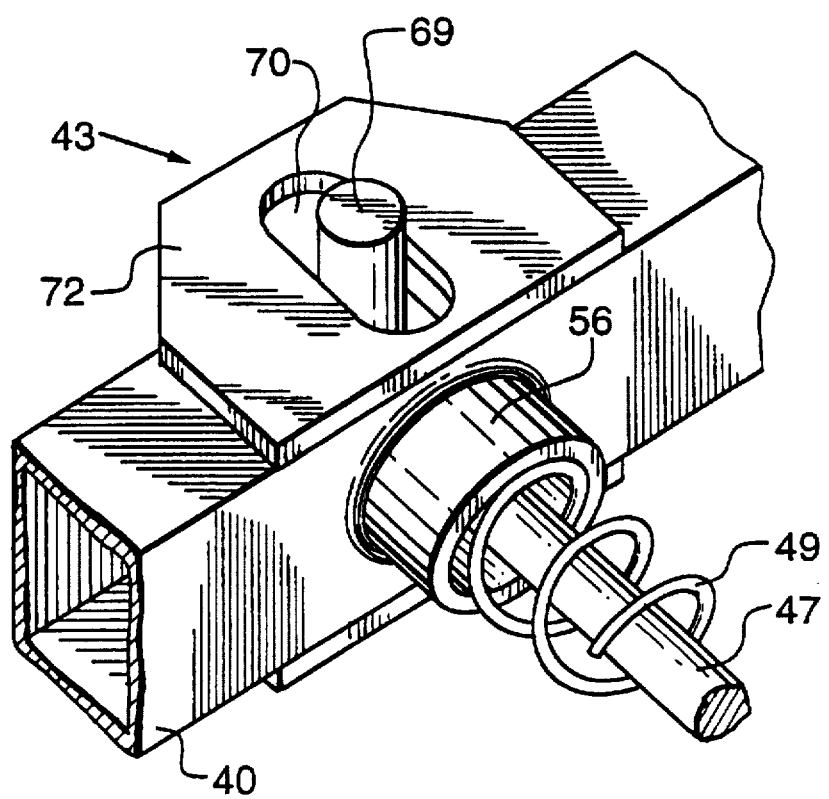
FIG. 3 is a diagram of one of the mechanical connections of the system of FIG. 1.

FIG. 3 shows the connector 43, by which the lower end of the actuator 45 is attached to the cross-bar 40. The spring 49 is wound into the collar 56 as previously described. The actuator rod 47 is disposed inside the spring 49, and is reciprocable axially inside the collar 56. The rod is reciprocable in turn with respect to the cross-bar 40. The actuator rod 47 terminates in a T-bar 69, which runs in slots 70 in plates 72 welded to the cross-bar 40. Thus the actuator rod has a measure of free play or lost motion with respect to the cross-bar, as defined by the length of the slots 70. The material of the cross-bar 40 is cut away, as required, to accommodate the desired length of the slots 70.

Figure 4:
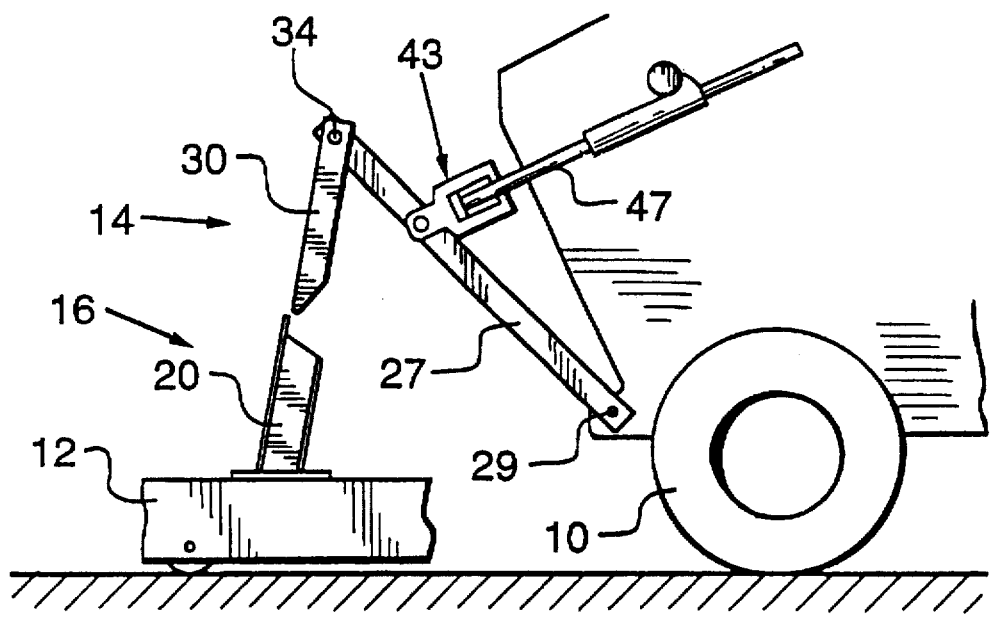
FIG. 4 is a diagrammatic side elevation, illustrating a phase in the operation of the system of FIG. 1.
Figure 5:
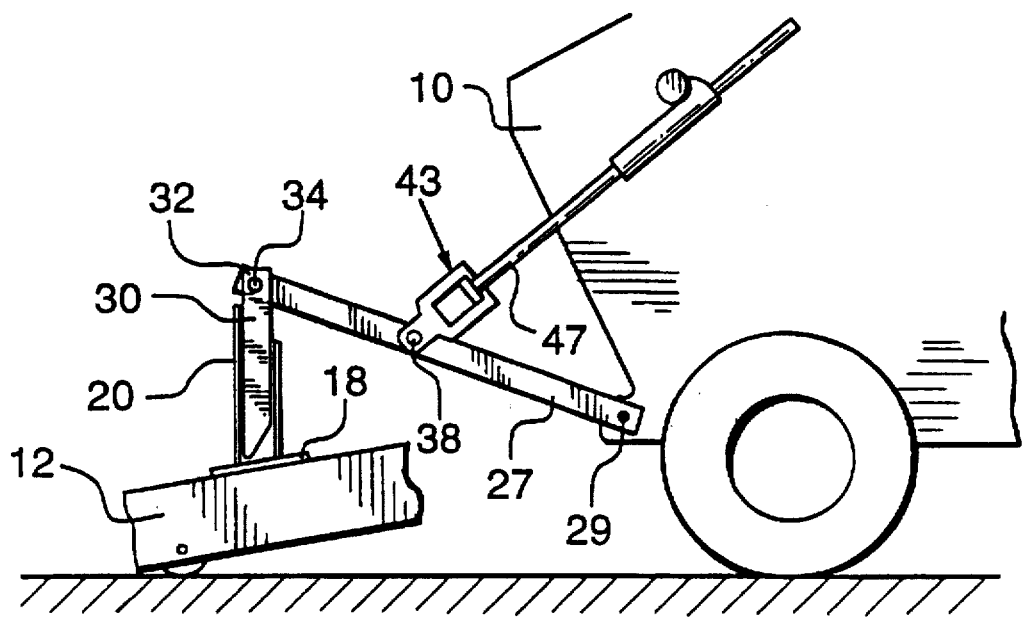
FIG. 5 is a view like that of FIG. 4, but showing another phase of the operation.

The operation of the above-described apparatus during hitching will now be described. FIGS. 4 and 5 show the operation diagrammatically. (For clarity, some of the structural features are shown in different positions from FIG. 1.)

In FIG. 4, the driver has raised the arms 27, which he does by shortening the electric actuator 45. The spring 49 is a tension spring, and acts to urge the arms 27 upwards; the lost-motion connection 43 is therefore disposed with the free-play of the connection disposed as shown in FIG. 4.

The grass mower 12 is lying on the ground (usually in a garden-house or storage shed), waiting to be picked up, by the hitching system, onto the tractor. The driver manoeuvres the tractor 10 until the pegs 30 overlie the sockets 20. The pegs are pointed at their bottom ends to facilitate entry into the sockets, allowing the driver to be a little inaccurate in positioning the tractor.

The designer of the system preferably should try to arrange the pegs and sockets so that the driver can visually observe whether the engagement is proceeding properly. However, even if the pegs and sockets cannot be seen by the driver, it has been found that the driver quickly learns where and how to position the tractor for a smooth engagement of the pegs into the sockets.

When the pegs 30 are properly aligned with the sockets 20 (FIG. 4), the driver then activates the electric actuator 45 into extension. The actuator rod 47 pushes the arms 27 downwards, and the pegs 30 start to enter downwards into the sockets 20. The pegs 30, with the cross-beam 32, are able to pivot about the pivot 34 to accommodate any angular misalignment between the pegs and the sockets. As the pegs become engage in the sockets, the orientation of the pegs, which are pivotable on the arms, becomes dictated by the disposition of the sockets, which are solid to the grass mower..

Downward entry of the pegs 30 into the sockets 20 continues until the latch assembly 36 (shown diagrammatically in FIG. 4) snags the latch pin 23. The driver now switches off the electric actuator. In fact, the driver reverses the electric actuator, so that the actuator rod is drawn upwards. Now, the weight of the grass mower is hanging on the arms 27, and the weight of the mower is sufficient to cause the spring 49 to extend. The rod 47 may be retracted until all the lost motion between the T-bar 69 in the slots 70 is taken up: further shortening of the actuator 45 now serves to lift the arms 27, and to lift the grass mower off the ground, and to transfer the weight of the mower to the (front wheels of the) tractor.

Now the tractor and grass mower are set for operation to cut grass. With the mower raised clear of the ground, the driver drives the tractor and hitched mower out of the shed, and into position on the grass. Now, he uses the electric actuator to lower the mower. The mower falls under its own weight, extending the spring 49, until the mower rests on the ground. Now, the driver stops the actuator 45, leaving the weight of the mower partially hanging from the tractor and partially resting on the ground. When mowing starts, if a bump in the ground causes the mower to rise, the combination of the spring and the lost motion connection allows the mower to rise, and yet still to be (partially) supported by the spring.

When mowing is finished, the driver drives the tractor, with the mower still hitched, back into the shed. The driver may wish to raise the mower completely off the ground during transit, which he can accomplish by means of the electric actuator. When the mower is in position, the driver releases the latch 36. The prudent driver, to avoid dropping the mower from a height, will take care to lower the mower to the ground before releasing the latch. When the latch is released, the spring 49—now relieved of the weight of the mower—will snap the arm 27 upwards, taking up whatever clearance or slack is present in the lost-motion connection 43.

In operational use, with the mower suspended from the tractor in the manner as described, the mower can accommodate slight changes in ground level (such as are present on many lawns). If the mower's weight were not resiliently suspended, the whole weight of the mower might dig into the lawn if the ground level should change slightly. Thus, when suspended as described, the mower tends to "float" smoothly along the ground, even though the ground is not perfectly flat.

Pivoting motion can take place at the pivots 29 and 34, whereby the up/down suspension movement of the mower is friction-free, and yet the suspension movement is well-guided and constrained.

The mower is supported from the tractor in a very robust manner as far as horizontal forces are concerned, being forces in both the lateral and longitudinal directions. That is to say, if the driver were too casual, and were to carelessly drive the mower either forwards or sideways into a tree, for example, the heavy construction of the arms 27, and of the pegs 30 and the sockets 20, are well able to take the resulting shocks (within limits, of course). The forces associated with driving the mower into a tree are felt by the arms and the pivots 29,34, which can easily be made robust enough, and by the engagement between the pegs and the sockets. None of the forces associated with driving the mower into a tree are felt by the relatively fragile connection 43 or latch mechanism 36, for example.

The two pegs 30 are rigidly braced together by the cross-beam 32. However, the two arms 27 are not braced together, and so the assembly of the arms 27, the cross-beam 32, and the cross-bar 40, have little torsional rigidity. Therefore, the mower is able to tip easily, ie to rotate in the Roll-mode, about a longitudinal axis. In fact, of the three orthogonal modes, the mower is supported very rigidly against movement relative to the tractor in the Yaw-mode, is lightly supported on the resilience of the spring 49 in the Pitch-mode, and, as mentioned, can accommodate such unevenness in the ground as might cause tipping in the Roll-mode.

For ease of use, it is preferred to mount the accessory at the front of the tractor, so that the driver can see the accessory from his seat. The mountings of a front-mounted accessory midst be such that the accessory cannot move to the side. This may be contrasted with the less stringent requirements of a rear-mounted accessory, where it is quite common for the accessory to be hitched at a single point, and for the accessory to be able to swing in a horizontal arc about that point. For a front-mounted accessory, the solid anti-Yaw manner of attaching the accessory is a great advantage.

The designer should see to it that the mower component is aligned on the mower so that the pivot point 34 is reasonably close to the centre of gravity of the mower, for good conformance of the mower with the ground in the Pitch-mode. However, to prevent undue Pitch-mode tipping, an anti-Pitch support 74 may be provided. As will be understood from FIG. 1, the support 74 is adjustable.

It may be noted that the hitching system as described is able to accommodate up/down suspension movement of the mower relative to the tractor, and yet, during such movement, no relative motion takes place at the latch mechanism 36. The latch mechanism is not subject to wear and tear due to rubbing. Also, the latch mechanism is not subject to misalignment to any appreciable degree. The latch is only snagged when the peg 30 is just about fully engaged into the socket 20, whereby it can be guaranteed that latch pin 23 is in correct alignment before latching takes place.

When the pegs are inserted in the sockets, the peg cannot rotate relative to the socket, about the pivot 34. However, the peg is still free to pivot at 34 relative to the arm 27, and thus to undergo suspension movement. The connection between the pegs and the sockets can be made and unmade without the use of hand-tools, and indeed without the driver getting out of his seat on the tractor; and yet the connection, once made, has great strength and rigidity, at least against horizontal forces, which is where the strength is required. The long vertical engagement of the pegs in the sockets is the key to this horizontal strength.

It is emphasized again that notwithstanding its robust strength in the horizontal direction, the hitching system permits free suspension movement. This, performance should be viewed in the context of a hitching system that is hitched and unhitched by remote-control, and which requires no hand-tools to make it operational.

The engagement of the pegs with the sockets is in fact so robust that the mower can be allowed to be quite misaligned with respect to the tractor, prior to insertion of the pegs 30 into the sockets 20; so long as engagement can start at all, the peg-and-socket engagement is quite strong enough to drag the mower into alignment.

As described, all the moving parts of the hitching system are mounted on the tractor; only the static structure is mounted on the accessory. This is preferred because the accessory component must be repeated for each accessory. The accessory component should be designed to be simple to bolt onto a suitable surface on the body of the accessory, or the component may be moulded into the accessory, if desired.

In the case of an electric grass mower, the usual requirement is for power for the mower to be supplied by the tractor. The power connection preferably should be made automatically when the accessory is being hitched automatically. The power connection may be of the conventional engageable plug and socket type. To avoid straining the plug and socket due to misalignment, the components may be brought into alignment when the peg 30 is almost fully down into the socket 20—just like the latch 36.

In addition to the main power supply to the mower motors, a connection for the latch release solenoid also needs to be made.

Not every type of accessory has wheels. A post-hole borer, for example, can be mounted as an accessory on the tractor, and can be powered by the tractor's batteries. The post-hole borer, however, would be supported vertically prior to being picked up, and therefore it would be acceptable of the pegs 30 were set horizontally for picking up such an accessory as a post-hole borer. (The sockets of course would also be set horizontally.) The pegs and sockets are better horizontal because the main forces associated with a post-hole borer are vertical. The pivots 34 should not be too loose, because then the pegs would just dangle freely: preferably, the pivots 34 are frictionally stiff enough that a person can turn the peg through and angle about the pivot, but that the peg remains at the angle set by the person.

A post-hole borer does not require suspension movement capability, but rather requires that the weight of the tractor be available to provide the necessary downward force on the borer.

Some kinds of accessories have different requirements again. For example, a dump scoop may require to be raised completely off the ground for transit movement, and then to be tipped using the electric actuator. A snow plough or snow blower may require that some of the weight of the tractor be transferred to the accessory: whether the spring 49 is arranged in tension or in compression is dictated by the relative weights of the tractor and the accessory, and bearing in mind the nature of the task the accessory is to perform.

I claim:

1. Hitching system for hitching an accessory to a tractor, wherein:

the system comprises an accessory component and a tractor component;

the tractor component includes a tractor frame by means of which the tractor component may be attached to the tractor;

the tractor component includes an arm, and includes a pivot mount for pivotably mounting the arm with respect to the tractor;

the tractor component includes a power-operated variable length strut, and includes an operable means which is effective, when operated, to vary the length of the strut;

the variable length strut comprises a means for raising and lowering the arm;

the accessory component of the system includes an accessory frame by means of which the accessory component may be attached to the accessory;

one of the components includes a socket member end the other component includes a peg member;

the socket member is formed with an open mouth, into which the peg member can enter;

the peg member and the socket member have complementary dimensions, whereby the peg member can slide freely into the socket member and can fit snugly therein;

the power-operated variable length strut is so arranged in the hitching system that varying the length of the strut, when the peg is poised in alignment with the mouth of the socket, is effective to drive the peg member into the socket member;

the arrangement of the hitching system is such that the driver of the tractor can so position the tractor that the peg member is poised in alignment with the mouth of the socket member;

the system includes an operable latch which is effective, when operated, to latch the peg member into the socket member;

the position and arrangement of the latch is such that, when the peg member is latched into the socket member, the peg member is engaged fully into the socket member;

the system includes an operable latch release means, which is effective, when operated, to release the latch, whereby the peg member can be withdrawn from the socket member;

the physical structure of the accessory component is such that the accessory component is adapted for, and is suited for, a manner of operational use in relation to the tractor component, in which the accessory component is operationally urged bodily, as a whole structure, in a horizontal direction;

the open mouth of the socket member faces vertically in a first vertical sense and the peg member is aligned vertically in the opposite vertical sense;

the arrangement of the arm, and of the member on the tractor component, is such that lowering the arm downwards is effective to drive that member downwards, and into engagement with the member on the accessory components;

and the alignment of engagement of the peg member and socket member, when latched, is vertical, whereby forces acting between the tractor component and the accessory component in the horizontal direction have substantially no effect to urge relative movement of the peg and socket members, during operation, against the latch.

2. System of claim 1, wherein:

the accessory component includes the socket member, and the tractor component includes the peg member;

the peg member is pivotably attached to the arm, and the socket member is solidly attached to the accessory frame.

3. System of claim 1, wherein the latch is of the kind that is automatically self-operating, and the arrangement of the latch is such that the latch automatically self-operates when the peg is fully engaged in the socket.

4. System of claim 1, wherein, when the peg member is latched into the socket member, shortening the length of the variable length strut is effective to raise the accessory.

5. System of claim 1, wherein, when the latch release means is operated, and the latch is released, shortening the length of the variable length strut is effective to lift the peg out of the socket.

6. System of claim 1, wherein the system includes a suspension spring, acting between the tractor frame and the accessory frame, that is effective to urge the accessory upwards when the member is latched into the socket member.

7. System of claim 1, wherein the system includes a connection between the variable length strut and the arm, the connection being a lost-motion connection.

8. System of claim 1, wherein the system includes a manual latch release operating control, remotely operable by the driver, by means of which the driver can release the latch.

9. System of claim 1, wherein the system includes a manual strut operating control, remotely operable by the driver, by means of which the driver can vary the length of the strut.

10. System of claim 1, wherein, prior to latching, the peg member is positioned over and above the mouth of the socket member.

11. System of claim 1, wherein:

the aforesaid first vertical sense is upwards, in that the socket member is included on the accessory component, end the open mouth of the socket member faces upwards;

the aforesaid opposite vertical sense is downwards, in that the peg member is included on the tractor component, and is directed downwards.

12. System of claim 1, wherein:

the tractor and the accessory are provided with two of the said peg members and socket members respectively; the latch holds the peg members latched in the socket members, but is so positioned as to permit the accessory, when latched, to rock in Yaw-mode, about the latch, in that Yaw-mode rocking about the latch causes one peg member to rise while the other falls.

* * * * *